United States Patent
Horng et al.

(10) Patent No.: US 6,608,411 B2
(45) Date of Patent: Aug. 19, 2003

(54) DIRECT CURRENT BRUSHLESS MOTOR

(75) Inventors: Alex Horng, Kaohsiung (TW);
Tso-Kuo Yin, Kaohsiung Hsien (TW);
Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/987,306

(22) Filed: Nov. 14, 2001

(65) Prior Publication Data

US 2003/0090171 A1 May 15, 2003

(51) Int. Cl.⁷ .................................................. H02K 7/00
(52) U.S. Cl. ............................... 310/68 R; 310/DIG. 6; 310/207; 336/200
(58) Field of Search ..................... 310/68 R, DIG. 6, 310/254, 258, 259, 179–207, 208, 89, 40 MM; 336/200

(56) References Cited

U.S. PATENT DOCUMENTS

| | | | | |
|---|---|---|---|---|
| 3,736,543 A | * | 5/1973 | Lademann et al. | 336/200 |
| 4,431,932 A | * | 2/1984 | Nathenson et al. | 310/208 |
| 4,563,622 A | * | 1/1986 | Deavers et al. | 318/254 |
| 4,645,961 A | * | 2/1987 | Malsky | 310/156.07 |
| 4,665,331 A | * | 5/1987 | Sudo et al. | 310/68 R |
| 4,924,125 A | * | 5/1990 | Clark | 310/67 R |
| 4,939,400 A | * | 7/1990 | Matsushita et al. | 310/208 |
| 4,962,329 A | * | 10/1990 | Fujita et al. | 310/208 |
| 5,105,114 A | * | 4/1992 | Sickle et al. | 310/154.13 |
| 5,493,157 A | * | 2/1996 | Nakamura | 310/67 R |
| 5,920,139 A | * | 7/1999 | Fujiwara et al. | 310/154.11 |

* cited by examiner

Primary Examiner—Dang Le
(74) Attorney, Agent, or Firm—Bacon & Thomas, PLLC

(57) ABSTRACT

A direct current brushless motor includes a base having a receiving chamber whose one end is combined with a cover plate. The other end of the receiving chamber and the cover plate each have a shaft hole, for pivoting the rotation shaft of the rotor. A film printed circuit is mounted on the periphery of the base. The film printed circuit has at least two coil sets, a set of Hall sensing drive member, and a connecting end for connection with a power supply. The coil sets are oppositely distributed on the periphery of the base in an equally angular manner with the receiving chamber serving as a center. After the coil sets are energized, the multiple coil sets and the permanent magnet ring of the rotor may produce mutually repulsive forces, so that the rotor may be driven to rotate successively.

7 Claims, 5 Drawing Sheets

US 6,608,411 B2

DIRECT CURRENT BRUSHLESS MOTOR

BACKGROUND OF THE INVENTION

1. Field of the Invention

The present invention relates to a direct current brushless motor, and more particularly to a direct current brushless motor that may be worked, assembled and manufactured conveniently.

2. Description of the Related Art

A conventional direct current brushless motor structure shown in FIG. 5 comprises a cylindrical base 90 having a through hole (or a chamber) which is formed with a shaft hole 91 in which a rotation shaft of a rotor 92 is rotatably mounted. The base 90 has an outer wall formed with fixing members 93 for combination of coils 94. The base 90 is provided with a control member 95. The coil 94 is magnetically induced with the permanent magnet 96 of the rotor 92, so that the rotor 92 may be driven to rotate.

Another conventional direct current brushless motor structure shown in FIG. 6 comprises a base 80 having a through hole 81 whose one end is provided with a support portion 82. The base 80 has a control member 83, and an even number of coils 84. The base 80 is provided with a positioning member 85 made of magnetically conductive material mounted between two coils 84. The rotor 86 has a rotation shaft rotatably mounted in the support portion 82 of the base 80. The rotor 86 has a permanent magnet ring 87 which has a pole N and a pole S each having a strong magnetic region 88 respectively. Thus, when the rotor 86 stops rotating, the strong magnetic region 88 and the positioning member 85 of the base 80 attract magnetically.

The above-mentioned conventional direct current brushless motor structures need to have even numbers of coils that are fixed on the periphery of the base respectively. Thus, the conventional direct current brushless motor structures need to be wound with even numbers of coils previously during fabrication, and the even numbers of coils are then fixed on the periphery of the base respectively, thereby causing inconvenience in fabrication.

SUMMARY OF THE INVENTION

The primary objective of the present invention is to provide a direct current brushless motor that may be worked, assembled and manufactured conveniently.

A secondary objective of the present invention is to provide a direct current brushless motor that may reduce the cost of fabrication.

In accordance with the present invention, there is provided a direct current brushless motor, including a base having a receiving chamber whose one end is combined with a cover plate. The other end of the receiving chamber and the cover plate each have a shaft hole, for pivoting the rotation shaft of the rotor. A film printed circuit is mounted on the periphery of the base. The film printed circuit has at least two coil sets, a Hall sensing drive member set, and a connecting end for connection with a power supply. The coil sets of the film printed circuit are oppositely distributed on the periphery of the base in an equally angular manner with the receiving chamber serving as a center. After the multiple coil sets are energized, the multiple coil sets and the permanent magnet ring of the rotor may produce mutually repulsive forces, so that the rotor may be driven to rotate successively.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
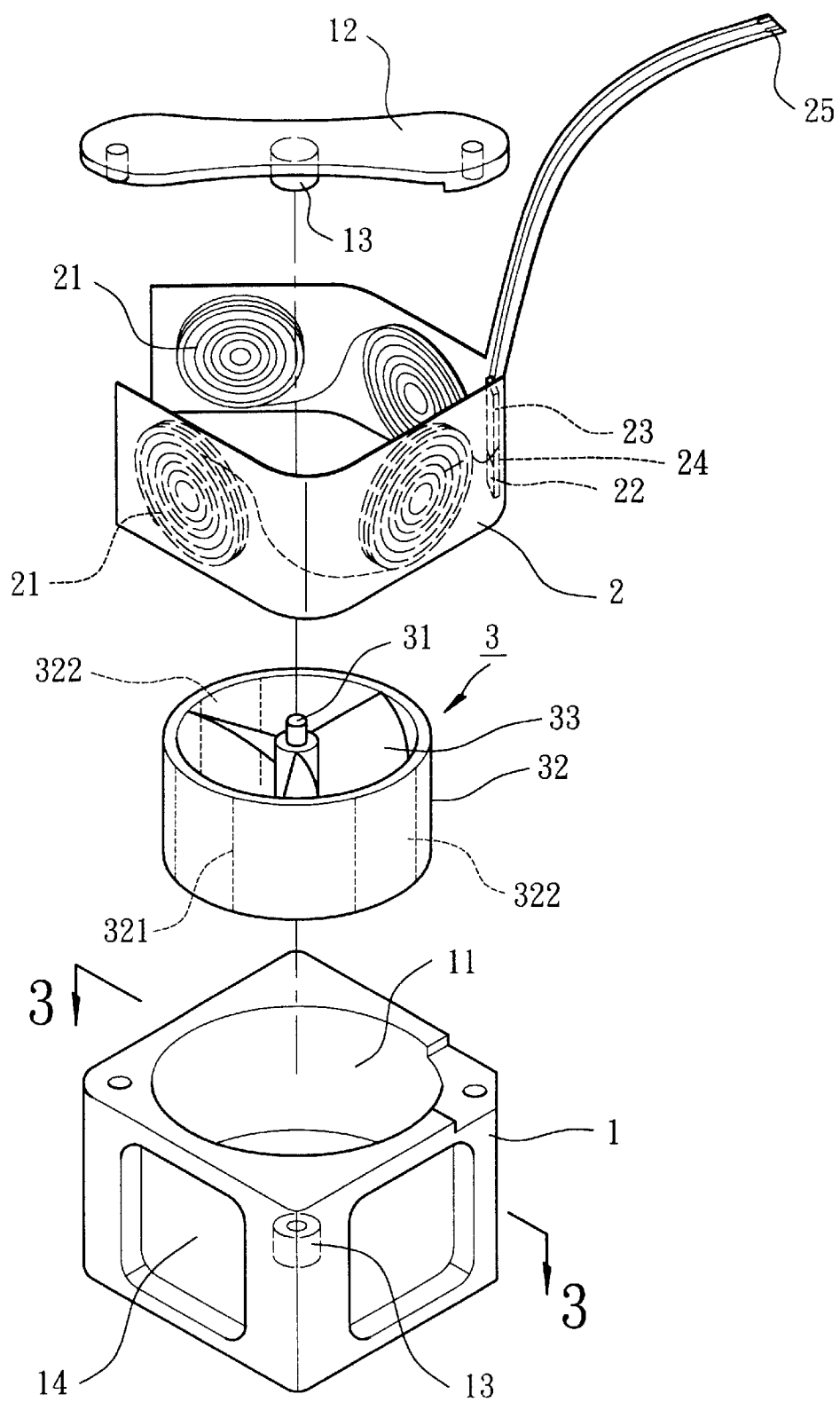
FIG. 1 is an exploded perspective view of a direct current brushless motor in accordance with a first embodiment of the present invention.

Referring to the drawings and initially to FIG. 1, a direct current brushless motor in accordance with the first embodiment of the present invention comprises a base 1, a film printed circuit (F.P.C.) 2, and a rotor 3.

The base 1 may be a housing of a motor, a heatsink fan or the like. The base 1 has a receiving chamber 11 whose one end is formed with an opened end, so that the rotor 3 may be received and rotated in the receiving chamber 11. A cover plate 12 is then mounted on the opened end of the receiving chamber 11. If necessary, the cover plate 12 may be fixed on the base 1 by various fixing methods, each of the cover plate 12 and the base 1 has a shaft hole 13 for pivoting the rotation shaft 31 of the rotor 3. In the preferred embodiment, the shaft hole 13 may be fitted with an abrasion-proof member such as a bearing, a bushing or the like, so that the rotation shaft 31 of the rotor 3 may be rotatably mounted in the abrasion-proof member. The base 1 has an outer wall formed with multiple receiving holes 14 for positioning and receiving the film printed circuit 2.

The film printed circuit 2 has at least two coil sets 21, and a Hall sensing drive member set. The Hall sensing drive member set includes a Hall sensor 22, and a drive member 24, and has a connecting end 25 for connection with the power supply. The film printed circuit 2 additionally has a fixing magnetic member 23 that is made of magnetically conductive material. The film printed circuit 2 is enclosed and wound around the periphery of the base 1. If necessary, the film printed circuit 2 may be positioned by and received in the receiving holes 14 of the base 1. Each of the coil sets 21 of the film printed circuit 2 are oppositely distributed on the periphery of the base 1 in an equally angular manner with the receiving chamber 11 serving as a center.

The rotor 3 bas a rotation shaft 31 having two ends each rotatably mounted in the shaft hole 13 of the base 1 and the cover plate 12 respectively. The rotor 3 has a permanent magnet ring 32. The rotation shaft 31 and the permanent magnet ring 32 are connected by blades 33. Thus, when the rotor 3 is rotated, the air may be driven to flow. The permanent magnet ring 32 is formed with at least two interface regions 321. Between the two interface regions 321 are poles N and S. The intermediate positions of the poles N and S are the strong magnetic regions 322. When the rotor 3 stops rotating relative to the film printed circuit 2, one of the strong magnetic regions 322 of the permanent magnet ring 32 and the fixing magnetic member 23 of the film printed circuit 2 may produce an attractive action, thereby forming a positioning and stopping action, so that the rotor 3 is easy to start at the next starting action.

Figure 3:
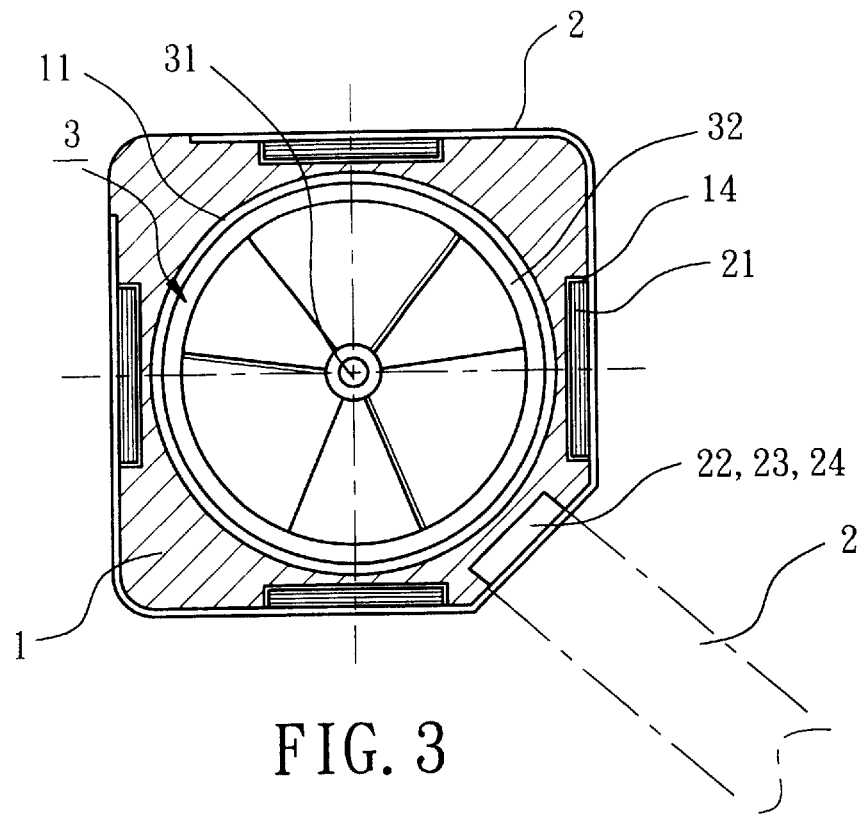
FIG. 3 is a top plan cross-sectional assembly view of the direct current brushless motor as shown in FIG. 1.

Referring to FIG. 3, the direct current brushless motor in accordance with the first embodiment of the present invention is assembled. The film printed circuit 2 is enclosed and wound around the periphery of the base 1, and each of the coil sets 21 of the film printed circuit 2 are oppositely distributed on the periphery of the base 1 in an equally angular manner with the receiving chamber 11 of the base 1 serving as a center. The rotor 3 may be placed into the receiving chamber 11 of the base 1. Thus, when the connecting end 25 of the film printed circuit 2 is electrically connected to the power supply, the poles N and S of the permanent magnet ring 32 of the rotor 3 and each of the coil sets 21 of the film printed circuit 2 may produce mutually repulsive magnetic forces. The Hall sensor 22 may detect variation of the poles N and S of the permanent magnet ring 32 of the rotor 3, thereby varying the magnetic force produced by the coils 21. Thus, the rotor 3 may be driven to rotate successively. When the electric power to the connecting end 25 is stopped, the rotor 3 stops rotating, the strong magnetic region 322 of the permanent magnet ring 32 of the rotor 3 and the fixing magnetic member 23 of the film printed circuit 2 may produce an attractive action, thereby forming a positioning and stopping action, so that the rotor 3 is easy to start at the next starting action.

Figure 2:
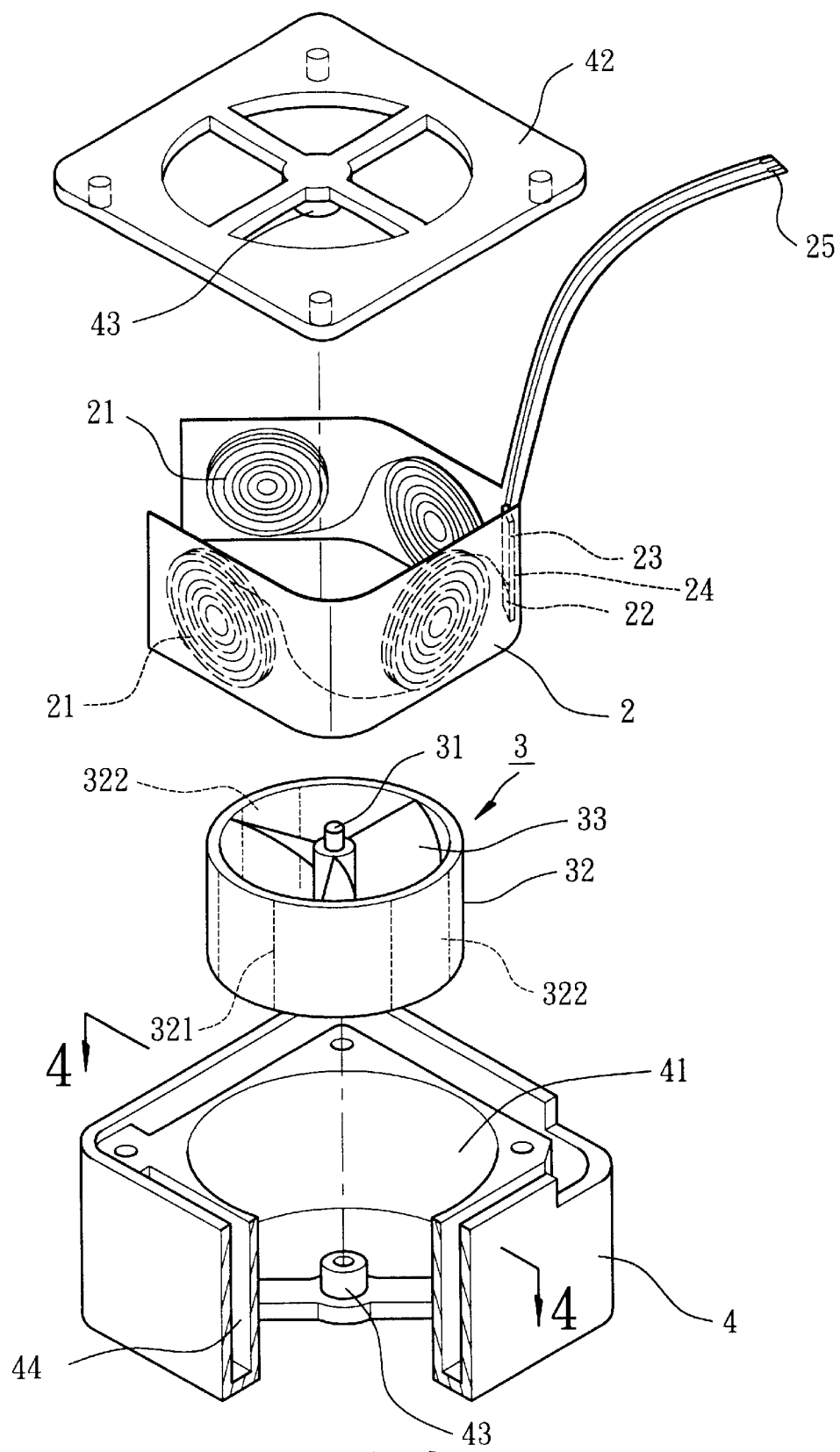
FIG. 2 is an exploded perspective view of a direct current brushless motor in accordance with a second embodiment of the present invention.
Figure 4:
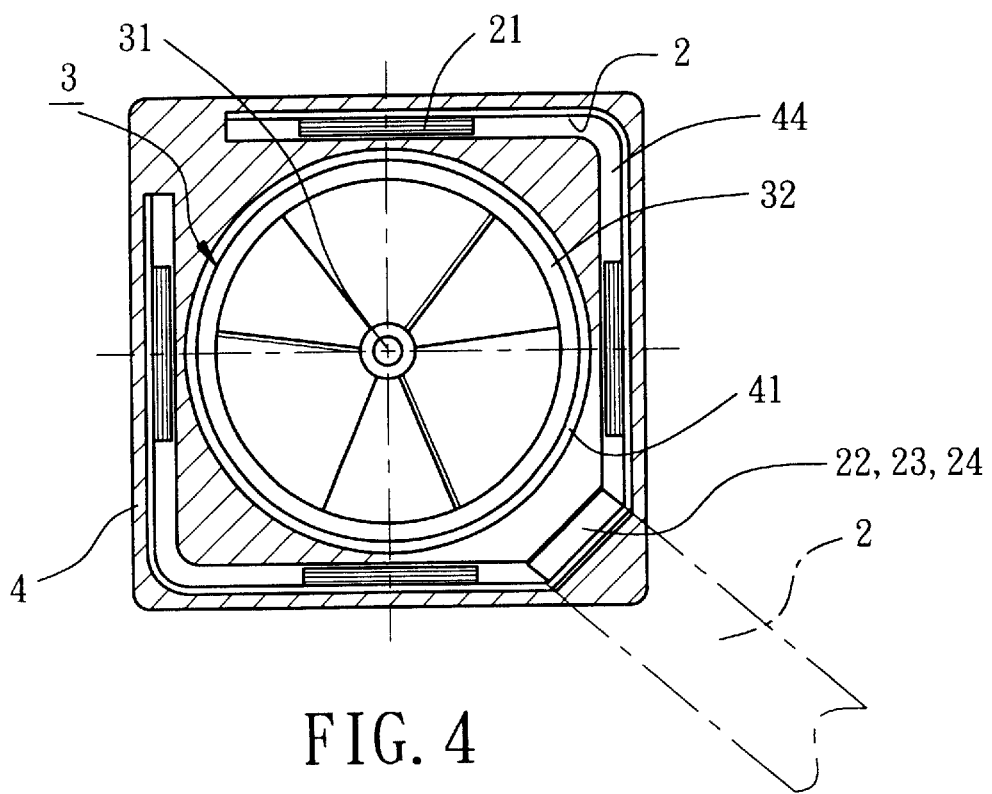
FIG. 4 is a top plan cross-sectional assembly view of the direct current brushless motor as shown in FIG. 2.
Figure 5:
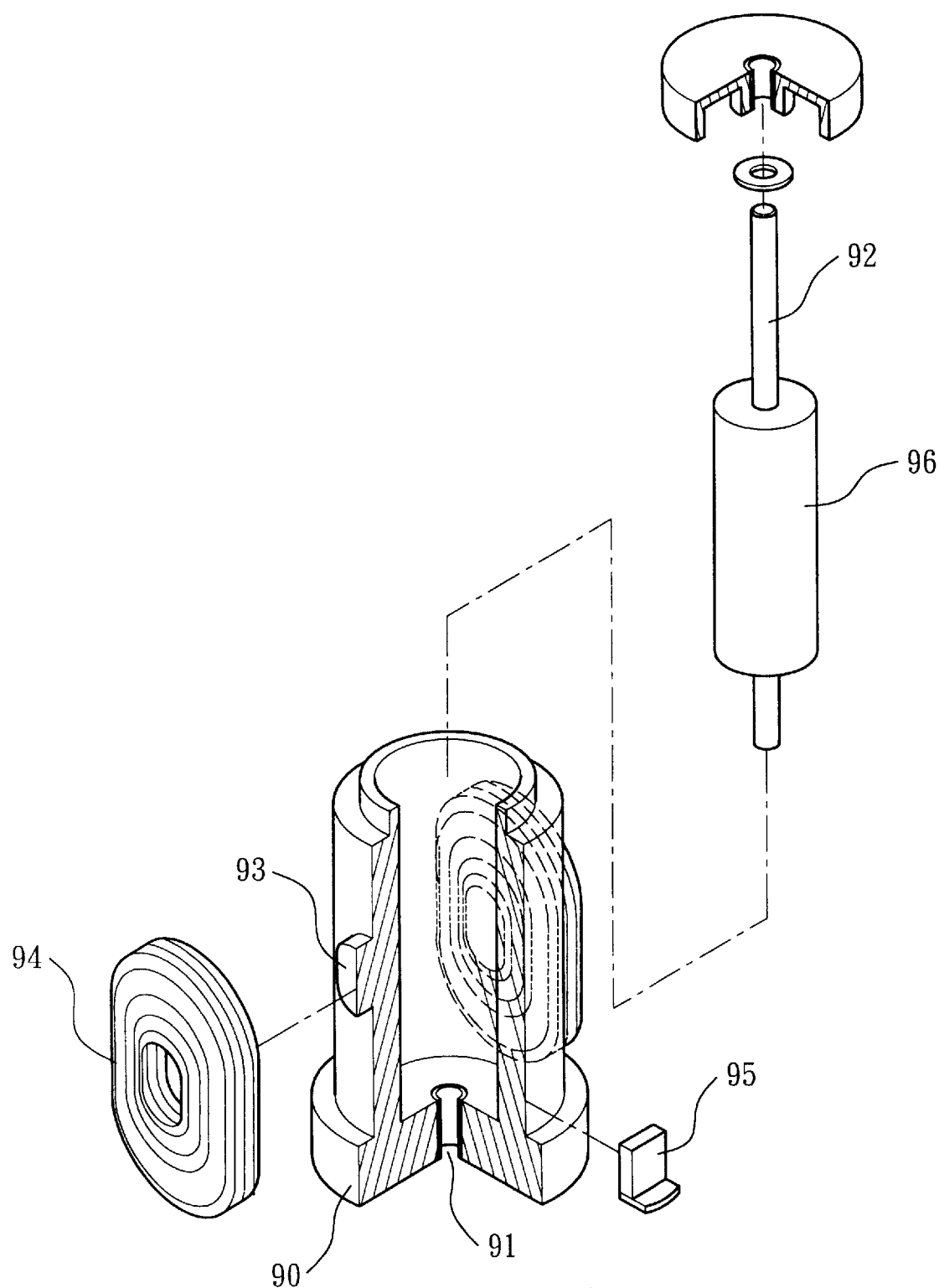
FIG. 5 is an exploded perspective view of a first conventional direct current brushless motor in accordance with the prior art.
Figure 6:
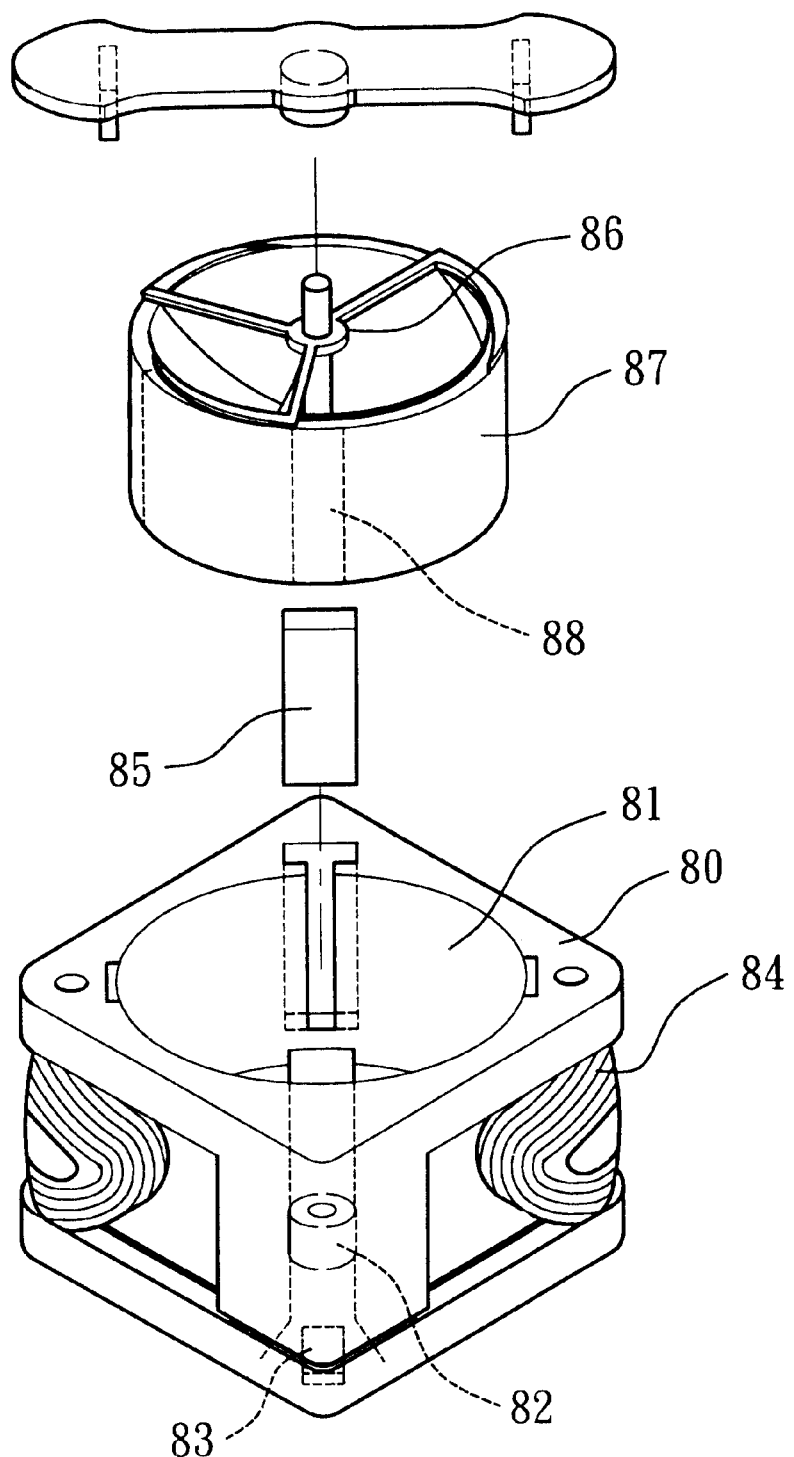
FIG. 6 is an exploded perspective view of a second conventional direct current brushless motor in accordance with the prior art.

Referring to FIGS. 2 and 4, the direct current brushless motor in accordance with the second embodiment of the present invention is shown. The rotor 3 is placed into the receiving chamber 41 of the base 4, and a cover plate 42 is secured on and combined with the base 4. Each of the cover plate 42 and the base 4 has a shaft hole 43 for pivoting the rotation shaft 31 of the rotor 3. The base 4 has a periphery provided with a single slot 44, for receiving the film printed circuit 2, and each of the coil sets 21 of the film printed circuit are oppositely distributed on the periphery of the base 4 in an equally angular manner with the receiving chamber 41 of the base 4 serving as a center. Thus, the film printed circuit 2 may be protected by the base 4, and may obtain a better positioning provision.

Accordingly, in the direct current brushless motor in accordance with the present invention, each of the coil sets and a set of Hall sensing drive member are formed on the film printed circuit 2, thereby reducing respective mounting and positioning of each of the coil sets. Thus, fabrication of the direct current brushless motor may be made more simple and convenient, and cost of fabrication may be reduced. Further, by provision of the fixing magnetic member of the film printed circuit, when the rotor stops rotating, the strong magnetic region of the permanent magnet ring of the rotor and the fixing magnetic member of the film printed circuit may produce an attractive action, thereby forming a positioning and stopping action, so that the rotor is easy to start at the next starting action.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A direct current brushless motor, comprising:

a base, having a single slot extending around a periphery of the base and a receiving chamber whose one end is formed with a shaft hole;

a film printed circuit, having at least two coil sets, a Hall sensing drive member set, and a connecting end for connecting on with a power supply, the film printed circuit being positioned in the signal slot so as to extend around a periphery of the base, and each of the coil sets of the film printed circuit being oppositely distributed on the periphery of the base in an equally angular manner with the receiving chamber serving as a center; and a rotor, having a rotation shaft and a permanent magnet ring, the rotation shaft pivoted on the shaft hole of the base, the permanent magnet ring and each of the coil sets around the periphery of the base directly producing mutually repulsive forces, so that the rotor is driven to rotate successively.

2. The direct current brushless motor as claimed in claim 1, wherein the rotation shaft and the permanent magnet ring of the rotor are connected by blades.

3. The direct current brushless motor as claimed in claim 1, wherein the film printed circuit is provided with a fixing magnetic member that is made of magnetically conductive material.

4. The direct current brushless motor as claimed in claim 1, wherein one end of the receiving chamber of the base is combined with a cover plate.

5. The direct current brushless motor as claimed in claim 4, wherein the cover plate has a shaft hole for pivoting the rotation shaft of the rotor.

6. The direct current brushless motor as claimed in claim 1, wherein the Hall sensing drive member set includes a Hall sensor, and a drive member.

7. The direct current brushless motor as claimed in claim 1, wherein the Hall sensing drive member set is integrated to make an integrated circuit.

* * * * *